United States Patent [19]

Kusumi et al.

[11] Patent Number: 5,399,601
[45] Date of Patent: Mar. 21, 1995

[54] ALKOXYSILYL GROUP-CONTAINING ACRYLIC COPOLYMER WITH ALKOXYSILICON COMPOUND

[75] Inventors: Akira Kusumi, Kakogawa; Hitoshi Tamai, Takasago; Naotami Ando, Hyogo; Hisao Furukawa, Kobe, all of Japan

[73] Assignee: Kanegafuchi Kagaku Kogyo Kabushiki Kaisha, Osaka, Japan

[21] Appl. No.: 253,122

[22] Filed: Jun. 2, 1994

[30] Foreign Application Priority Data

Jun. 3, 1993 [JP] Japan ................................. 5-133412

[51] Int. Cl.⁶ ........................... C08K 5/15; C08K 5/16; C08K 5/54
[52] U.S. Cl. .................................. 524/188; 524/265; 524/730; 528/16; 528/17; 528/18
[58] Field of Search .................. 524/730, 188, 265; 528/16, 17, 18

[56] References Cited

U.S. PATENT DOCUMENTS

| | | | |
|---|---|---|---|
| 4,895,910 | 1/1990 | Isozaki et al. | 528/27 |
| 4,910,252 | 3/1990 | Yonehara et al. | 524/730 |
| 4,965,312 | 10/1990 | Nakai et al. | 524/730 |
| 5,248,715 | 9/1993 | Gray et al. | 524/730 |

*Primary Examiner*—Robert E. Sellers
*Attorney, Agent, or Firm*—Varndell Legal Group

[57] ABSTRACT

A room temperature curable composition suitable as top coat and providing coating films having good properties such as surface appearance, gloss, stain resistance, weatherability and adhesion and a small contact angle with water, which comprises (A) an acrylic copolymer having a specific reactive silicon-containing group such as alkoxysilyl group, (B) a specific hydrolyzable silicon compound and/or its partial hydrolysis condensation product, (C) a specific curing catalyst such as an organic carboxylic acid, a combination of an organic carboxylic acid with an organic amine, or an organometallic compound, and (D) an adhesion improving agent such as a silane coupling agent or its reaction product with an epoxy compound.

9 Claims, No Drawings

ALKOXYSILYL GROUP-CONTAINING ACRYLIC COPOLYMER WITH ALKOXYSILICON COMPOUND

BACKGROUND OF THE INVENTION

The present invention relates to a curable resin composition for top coating, and more particularly to a room temperature curable composition which has excellent stain resistance and adhesion in addition to excellent other properties such as weatherability and surface properties and which is suitably applicable as top coat to various articles such as buildings, household electric appliances and industrial equipments made of various materials such as metal, ceramics, glass, cement, plastics, wood, paper and fiber.

In order to improve appearance, corrosion resistance, weatherability and the like, it has been generally made to apply a paint, e.g. fluorocarbon resin paint, acrylic urethane paint or acrylic silicon paint, to surface of ceramic products, surface of buildings which are composed of concrete, stem and the like, surface of products for industrial use such as building materials, and surfaces of other various products.

On the other hand, in recent years, stain resistance of paints used for the above purpose is increasingly demanded from the viewpoints of worsening of environment in and around towns and cities and rise in consciousness of beauty or consciousness to maintain scene or appearance.

Among the paints as mentioned above, acrylic silicone paints are superior in stain resistance, but are still insufficient under severe environment.

It is an object of the present invention to provide a coating composition, particularly a coating composition suitable for use in top coating, which has an excellent stain resistance in addition to properties required for coatings such as weatherability, adhesion, surface smoothness, gloss and the like.

A further object of the present invention is to provide a curable resin composition for use as a top coat, which is curable at room temperature and provides coatings having an excellent stain resistance and excellent other properties such as appearance, gloss, adhesion and weatherability.

These and other objects of the present invention will become apparent from the description hereinafter.

SUMMARY OF THE INVENTION

It has been found that an acrylic copolymer having a reactive silyl group such as alkoxysilyl group provides a coating composition which is curable at room temperature and can give coatings having excellent stain resistance and adhesion in addition to excellent other properties required for paints such as weatherability comparable with that of known acrylic silicone paints, appearance and gloss, when it is combined with a specific hydrolyzable silicon compound, a specific curing catalyst and an agent for improving adhesion in a specific proportion.

In accordance with the present invention, there is provided a curable resin composition useful as a top coat, which comprises:

(A) an acrylic copolymer having a reactive silicon-containing group of the formula (I):

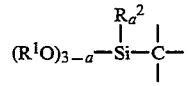

wherein $R^1$ is hydrogen atom or an alkyl group having 1 to 10 carbon atoms, $R^2$ is hydrogen atom or a monovalent hydrocarbon group selected from the group consisting of an alkyl group having 1 to 10 carbon atoms, an aryl group and an aralkyl group, and $a$ is 0, 1 or 2, (B) 2 to 70 parts of at least one member selected from the group consisting of a silicon compound of the formula (II):

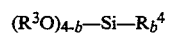

wherein $R^3$ is a monovalent hydrocarbon group selected from the group consisting of an alkyl group having 1 to 10 carbon atoms, an aryl group and an aralkyl group, $R^4$ is a monovalent hydrocarbon group selected from the group consisting of an alkyl group having 1 to 10 carbon atoms, an aryl group and an aralkyl group, and $b$ is 0 or 1, and a condensate of a partial hydrolysis product of said silicon compound (II), (C) 0.1 to 20 parts of at least one curing catalyst selected from the group consisting of an organic carboxylic acid compound, a combination of an organic carboxylic acid compound and an organic amine compound, and an organometallic compound, and (D) 0.1 to 20 parts of an agent for improving adhesion, said parts of (B), (C) and (D) being parts by weight per 100 parts by weight of said acrylic copolymer (A).

DETAILED DESCRIPTION

The curable resin composition suitable as a top coating paint according to the present invention contains, as a base resin curable at room temperature in the presence of moisture, an acrylic copolymer (A) having a reactive silicon-containing group of the formula (I):

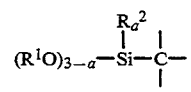

wherein $R^1$ is hydrogen atom or an alkyl group having 1 to 10 carbon atoms, $R^2$ is hydrogen atom or a monovalent hydrocarbon group selected from the group consisting of an alkyl group having 1 to 10 carbon atoms, an aryl group and an aralkyl group, and $a$ is 0, 1 or 2.

The acrylic copolymer (A) has a main chain substantially composed of a copolymer of acrylic monomer or monomers with or without other vinyl monomers, namely a main chain composed of a copolymer containing at least 50% by weight, especially at least 70% by weight, of units of acrylic monomer or monomers. Since the main chain of the acrylic copolymer (A) is substantially composed of an acrylic copolymer, the coating films formed from the composition of the present invention have good properties such as weatherability and chemical resistance.

It is preferable that the acrylic copolymer (A) has at least two reactive silicon-containing groups (I), especially at least three groups (I), per one molecule, since the coating films formed from the composition of the present invention are superior in durability such as weatherability and solvent resistance.

Since the silicon-containing reactive group (I) is included in the acrylic copolymer (A) in such a form that a reactive silyl group such as alkoxysilyl group is bonded to carbon atom, the acrylic copolymer (A) provides coating films having good water resistance, alkali resistance and acid resistance. For example, the reactive silyl group is bonded directly to a carbon atom of the main chain or bonded to the main chain through a carbon atom.

The acrylic copolymer (A) may have the reactive group or groups (I) at one or both ends of the polymer chain, or in or as side chain or chains, or at both the polymer chain end or ends and the side chain or chains.

In the formula (I), $R^1$ is hydrogen atom or an alkyl group having 1 to 10 carbon atoms, preferably 1 to 4 carbon atoms, such as methyl group, ethyl group, n-propyl group, n-butyl group or isobutyl group. When the number of carbon atoms of the alkyl group is more than 10, the reactivity of the reactive group (I) is lowered. Also, when the group $R^1$ is a group other than alkyl group, such as phenyl group or benzyl group, the reactivity is low.

In the formula (I), $R^2$ is hydrogen atom or a monovalent hydrocarbon group. The monovalent hydrocarbon group for $R^2$ is selected from an alkyl group having 1 to 10 carbon atoms, preferably 1 to 4 carbon atoms, such as methyl group, ethyl group, n-propyl group, n-butyl group or isobutyl group; an aryl group, preferably an aryl group having 6 to 25 carbon atoms, such as phenyl group; and an aralkyl group, preferably an aralkyl group having 7 to 12 carbon atoms, such as benzyl group. An alkyl group having 1 to 4 carbon atoms is preferred as the group $R^2$ from the viewpoint of the curability of the composition of the present invention.

One to three groups $(R^1O)-$ be present in the reactive group (I). In other words, in the formula (I) a is 0, 1 or 2. It is preferable that two or three groups $(R^1O)-$ is present, namely a is 0 or 1, since the curability of the acrylic copolymer (A) is good. Thus, the number of the groups $R^2$ is preferably 0 or 1. When two or more groups $(R^1O)-$ or $R^2$ are present in the reactive group (I), $R^1$ or $R^2$ may be the same or different.

Representative examples of the silicon-containing reactive group (I) are those included in reactive silyl group-containing monomers mentioned after.

The silicon-containing reactive group (I) can be introduced into an acrylic copolymer in various known manners. The acrylic copolymers (A) prepared using a monomer having the silicon-containing reactive group (I) in its molecule are preferable from the viewpoint of easiness is in the synthesis of the copolymers (A). It is preferable from the viewpoints of the durability and strength of coating films that the content of units derived from the monomer having the group (I) in the acrylic copolymer (A) is from 3 to 90% by weight, especially from 11 to 70% by weight, more especially from 11 to 50% by weight.

The acrylic copolymer (A) contains units derived from a monomer other than the monomer having the group (I), for example, units derived from acrylic monomer and/or other monomers as mentioned after.

From the viewpoint of physical properties such as durability of coating films formed from the composition of the present invention, it is preferable that the acrylic copolymer (A) has a number average molecular weight of 1,000 to 30,000, especially 3,000 to 25,000.

The acrylic copolymer (A) may be used alone or in admixture thereof.

The acrylic copolymer (A) can be prepared by various known methods, for example, a hydrosilylation method or a solution polymerization method using a monomer having a reactive silyl group such as alkoxysilyl group, as described in Japanese Patent Publication Kokai No. 54-36395 and No. 57-55954.

For example, the acrylic copolymer (A) can be prepared by copolymerizing a monomer having a polymerizable double bond and the reactive silicon-containing group (I) ( the monomer being hereinafter referred to as "monomer A1"), an acrylic monomer such as acrylic or methacrylic acid or its derivatives (the acrylic monomer being hereinafter referred to as "monomer A2") and optionally other monomers copolymerizable therewith.

Typical examples of the monomer A1 are, for example, a compound of the formula (III):

wherein $R^1$, $R^2$ and a are as defined above, and $R^5$ is hydrogen atom or methyl group, e.g.

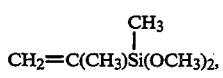

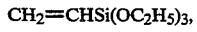

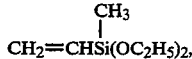

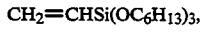

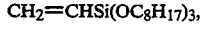

a compound of the formula (IV):

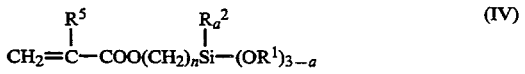

wherein $R^1$, $R^2$, $R^5$ and a are as defined above, and n is an integer of 1 to 12, e.g.

-continued $$CH_2=CHCOO(CH_2)_3Si(OCH_3)_2\underset{|}{\overset{CH_3}{}}$$

$$CH_2=C(CH_3)COO(CH_2)_3Si(OCH_3)_3,$$

$$CH_2=C(CH_3)COO(CH_2)_3Si(OCH_3)_2\underset{|}{\overset{CH_3}{}}$$

$$CH_2=CHCOO(CH_2)_3Si(OC_2H_5)_3,$$

$$CH_2=CHCOO(CH_2)_3Si(OC_2H_5)_2\underset{|}{\overset{CH_3}{}}$$

$$CH_2=C(CH_3)COO(CH_2)_3Si(OC_2H_5)_3,$$

$$CH_2=C(CH_3)COO(CH_2)_3Si(OC_2H_5)_2\underset{|}{\overset{CH_3}{}}$$

$$CH_2=C(CH_3)COO(CH_2)_{11}Si(OCH_3)_3;$$

a compound of the formula (V):

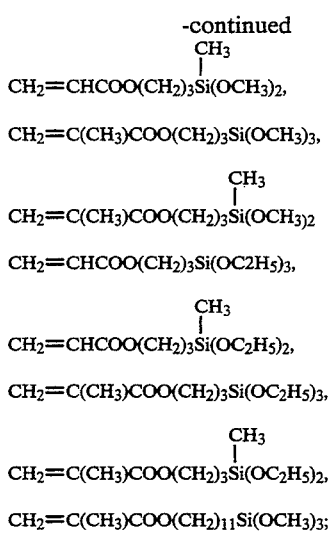

(V)

wherin $R^1$, $R^2$, $R^5$, a and n are as defined above, e.g.

$$CH_2=CH-CH_2OCO(o-C_6H_4)COO(CH_2)_3Si(OCH_3)_3,$$

$$CH_2=CH-CH_2OCO(o-C_6H_4)COO(CH_2)_3Si(OCH_3)_2\underset{|}{\overset{CH_3}{}};$$

a compound of the formula (VI):

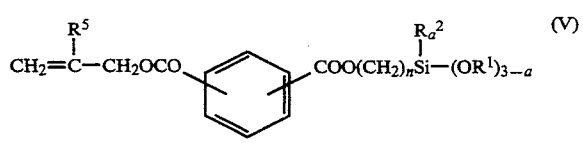

(VI)

wherein $R^1$, $R^2$, $R^5$ and a are as defined above, and m is an integer of 1 to 14, e.g.

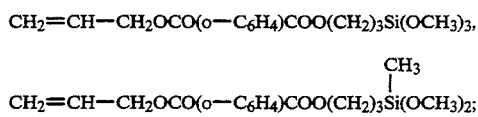

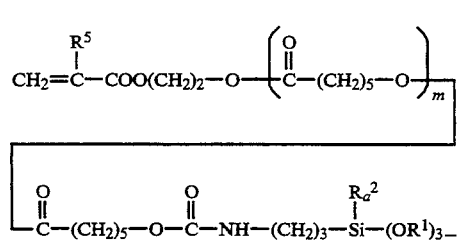

a compound of the formula (VII):

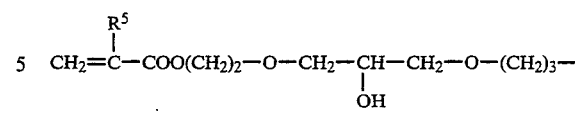

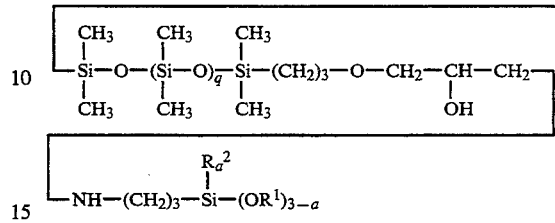

wherein $R^1$, $R^2$, $R^5$ and a are as defined above, and q is 0 or an integer of 1 to 22, e.g.

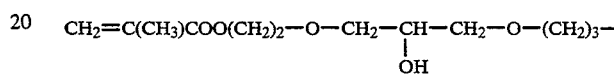

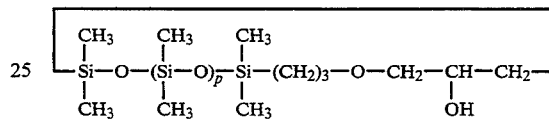

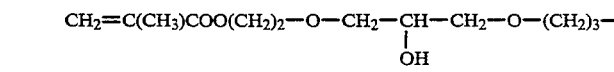

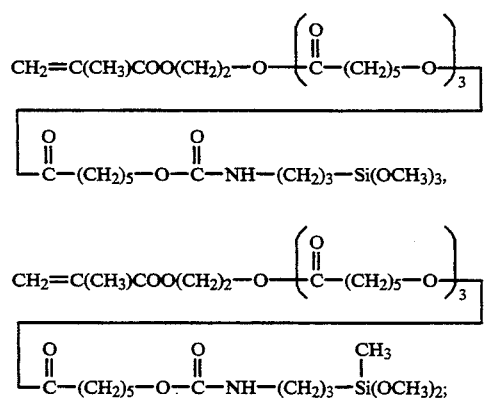

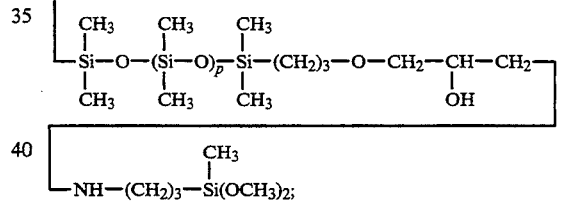

an acrylate or methacrylate having the reactive group (I) at the molecular end through a urethane bond or a siloxane bond; and the like.

Among them, the acrylate or methacrylate compound (IV) is preferred, since it is superior in copolymerizability and polymerization stability of the monomer and in curability and storage stability of the obtained coating composition.

The monomers A1 may be used alone or in admixture thereof.

The monomers A1 are used in an amount to provide the acrylic copolymer (A) containing 3 to 90% by weight, preferably 11 to 70% by weight, more preferably 11 to 50% by weight, of units derived therefrom, namely units derived from a monomer having the reactive group (I).

Typical examples of the acrylic monomer A2 to be copolymerized with the monomer A1 are, for instance, acrylic acid, methacrylic acid, an alkyl (meth)acrylate (the term (meth)acrylate showing acrylate or methacrylate, hereinafter the same) such as methyl (meth)acrylate, ethyl (meth)acrylate, butyl (meth)acrylate, 2-ethylhexyl (meth)acrylate or stearyl (meth)acrylate, benzyl (meth)acrylate, cyclohexyl (meth)acrylate, a haloalkyl (meth)acrylate such as trifluoroethyl (meth)acrylate or pentafluoropropyl (meth)acrylate, perfluorocyclohexyl (meth)acrylate, acrylonitrile, methacrylonitrile, glycidyl (meth)acrylate, dimethylaminoethyl (meth)acrylate, diethylaminoethyl (meth)acrylate, (meth)acrylamide (acrylamide or methacrylamide, hereinafter the same), α-ethyl (meth)acrylamide N-butoxymethyl (meth)acrylamide, N,N-dimethyl (meth)acrylamide, N-methyl (meth)acrylamide, (meth)acryloyl morpholine, a hydroxyalkyl (meth)acrylate such as 2-hydroxyethyl (meth)acrylate or 2-hydroxypropyl (meth)acrylate, N-methylol (meth)acrylamide, "Aronix M-5700" (which is commercially available from Toagosei Chemical Industry Co., Ltd.), a macromet such as "AS-6", "AN-6", "AA-6", "AB-6" or "AK-5" (which are commercially available from Toagosei Chemical Industry Co., Ltd.), a compound such as "Placcel FA-1", "Placcel FA-4", "Placcel FM-1" or "Placcel FM-4" (which are commercially available from Daicel Chemical Industries, Ltd.), a phosphate group-containing (meth)acrylic compound such as a condensation product of a hydroxyalkyl (meth)acrylate with phosphoric acid or a phosphoric acid ester, an acrylate or methacrylate containing an urethane bond or siloxane bond, and the like.

n-Butyl methacrylate or a monomer mixture containing n-butyl methacrylate is particularly preferred as the acrylic monomer A2, since the obtained acrylic copolymer (A) has an excellent compatibility with a silicon compound (II) or a condensate of its partial hydrolysis product.

The acrylic monomers A2 may be used alone or in admixture thereof.

The amount of the monomer A2 is suitably selected according to the kind and amount of the monomer A1. The monomer A2 is usually used in an amount of 5 to 90% by weight, especially 30 to 85% by weight, more especially 50 to 85% by weight, based on the total weight of the monomers used. In case of using n-butyl methacrylate which is preferred as the monomer A2, it is preferable to use it in an amount of 20 to 50% by weight based on the total weight of the monomers used, from the viewpoints of a good compatibility of the acrylic copolymer (A) with the silicon compound (II) or its partial hydrolysis condensation product and a good balance between properties of coating films formed from the coating composition according to the present invention.

Segments containing urethane bond or siloxane bond may be introduced into the main chain of the acrylic copolymer (A) at the time of the preparation thereof in an amount of less than 50% by weight in order to further improve the weatherability or the like of coating films.

Also, the acrylic copolymer (A) may contain less than 50% by weight of units derived from other copolymerizable monomers than the monomers A1 and A2.

Examples of the other monomers copolymerizable with the monomers A1 and A2 are, for instance, an aromatic hydrocarbon vinyl compound such as styrene, α-methylstyrene, chlorostyrene, styrenesulfonic acid, 4-hydroxystyrene or vinyl toluene; an unsaturated carboxylic acid such as maleic acid, fumaric acid or itaconic acid, its salt such as alkali metal salt, ammonium salt or amine salt, and its anhydride such as maleic anhydride; an ester of the unsaturated carboxylic acid, e.g. a diester or half ester of the unsaturated carboxylic acid or anhydride with a linear or branched alcohol having 1 to 20 carbon atoms; a vinyl ester such as vinyl acetate or vinyl propionate; an allyl compound such as diallyl phthalate; an amino group-containing vinyl compound such as vinylpyridine or aminoethyl vinyl ether; an amido group-containing vinyl compound such as itaconic acid diamide, crotonamide, maleic acid diamide, fumaric acid diamide or N-vinyl-pyrrolidone; a vinyl ether such as 2-hydroxyethyl vinyl ether, methyl vinyl ether or cyclohexyl vinyl ether; vinyl chloride or vinylidene chloride; and other monomers such as chloroprene, propylene, butadiene, isoprene, fluoroolefin, maleimide, N-vinylimidazole or vinylsulfonic acid. These monomers may be used alone or in admixture thereof.

The acrylic copolymer (A) may contain an active hydrogen-containing group such as carboxyl group or amino group. These groups serve to raise the curability and the adhesion. However, these carboxyl group and amino group bonded to the polymer chain are low in activity and, therefore, they do not sufficiently act as a catalyst to provide a cured product having good properties.

The acrylic polymer (A) can be prepared by various methods, but a solution polymerization method using a monomer having the reactive group (I), namely monomer A1, and an azo radical polymerization initiator is particularly preferred from the viewpoint of easiness in synthesis.

Solvents to be used in a solution polymerization for the preparation of the acrylic copolymer (A) are not particularly limited so long as they are non-reactive. Examples of the solvent are, for instance, a hydrocarbon such as toluene, xylene, n-hexane or cyclohexane; an acetic acid ester such as ethyl acetate or butyl acetate; a cellosolve (ethylene glycolether) such as ethyl cellosolve or butyl cellosolve; a ether ester compound such as cellosolve acetate; a ketone such as methyl ethyl ketone, ethyl acetoacetate, acetylacetone, methyl isobutyl ketone and acetone; and the like.

In the solution polymerization, a chain transfer agent may be used in order to control the molecular weight of the acrylic copolymer (A). Examples of the chain transfer agent are, for instance, n-dodecyl mercaptan, t-dodecyl mercaptan, n-butyl mercaptan, γ-mercaptopropyltrimethoxysilane, γ-mercaptopropyltriethoxysilane, γ-mercaptopropylmethyldimethoxysilane, γ-mercaptopropylmethyldiethoxysilane, (CH$_3$O)$_3$Si—S—S—Si—(OCH$_3$)$_3$, (CH$_3$O)$_3$Si—S$_8$—Si(OCH$_3$)$_3$, and the like. They may be used alone or in admixture thereof. Particularly, when using a chain transfer agent having an alkoxysilyl group in its molecule, such as γ-mercaptopropyltrimethoxysilane, it is possible to introduce a reactive silyl group into the acrylic copolymer (A) at the polymer chain end. The amount of the chain transfer agent is usually from 0.05 to 10% by weight, preferably 0.1 to 8% by weight, based on the total weight of the monomers used.

In the present invention, there is used, together with the acrylic copolymer (A), a silicon compound of the formula (II):

wherein R$^3$ and R$^4$ each is a monovalent hydrocarbon group selected from the group consisting of an alkyl group having 1 to 10 carbon atoms, an aryl group and an aralkyl group, and b is 0 or 1; a condensate of a partial hydrolysis product of the silicon compound (II); or their mixtures [the silicon compound (II) and its partial hydrolysis condensation product being hereinafter referred to as "silicon compound (B)" or "component (B)"]. The component (B) serves to raise the stain resistance of coatings formed from the curable composition of the present invention and also to raise the adhesion between the coating and a material to be coated. A mixture of the acrylic copolymer (A) with the silicon compound (B) provides a composition which is curable at room temperature. The coating films formed therefrom have an excellent stain resistance, but its reason has not been made clear. Probably, it is presumed that the surface hardness and hydrophilic property of the coatings are improved based on a difference in relative rate of reaction between the acrylic copolymer (A) and the silicon compound (B) and a compatibility between them, and these improvements affect the stain resistance.

In the formula (II), $R^3$ is an alkyl group having 1 to 10 carbon atoms, preferably an alkyl group 1 to 4 carbon atoms, e.g. methyl group, ethyl group, n-propyl group, isopropyl group, n-butyl group or isobutyl group; an aryl group, preferably an aryl group having 6 to 9 carbon atoms, e.g. phenyl group; or an aralkyl group, preferably an aralkyl group having 7 to 9 carbon atoms, e.g. benzyl group. When the number of carbon atoms of the alkyl group is more than 10, the reactivity of the silicon compound (B) is lowered. Also, when the group $R^3$ is groups other than the alkyl, aryl and aralkyl groups, the reactivity is lowered.

The group $R^4$ in the formula (II) is an alkyl group having 1 to 10 carbon atoms, preferably an alkyl group having 1 to 4 carbon atoms, an aryl group, preferably an aryl group having 6 to 9 carbon atoms, or an aralkyl group, preferably an aralkyl group having 7 to 9 carbon atoms.

Three or four alkoxyl groups $(R^3O)-$ are present in the silicon compound (II). That is to say, in the formula (II), b for the group $R^4$ is 0 or 1. From the viewpoint that the curability of the composition is higher, it is preferable that b is 0 and four alkoxyl groups $(R^3O)-$ are present.

In case that two or more groups $(R^3O)-$ are present in the formula (II), the groups $R^3$ may be the same or different.

Examples of the silicon compound (II) are, for instance, a tetraalkyl silicate such as tetramethyl silicate, tetraethyl silicate, tetra-n-propyl silicate, tetraisopropyl silicate, tetra-n-butyl silicate or tetraisobutyl silicate; a trialkoxysilane such as methyltrimethoxysilane, methyltriethoxysilane, phenyltrimethoxysilane, phenyltriethoxysilane, octadecyltriethoxysilane, 3-glycidoxypropyltrimethoxysilane, methyltri-sec-octyloxysilane, methyltriphenoxysilane, methyltriisopropoxysilane or methyltributoxysilane; and the like.

The partial hydrolysis condensation product of the silicon compound (II) can be easily obtained by mixing one or more silicon compounds (II) with a necessary amount of water with or without a condensation catalyst and condensing at room temperature or an elevated temperature with removing the produced alcohol from the reaction system.

The partial hydrolysis condensation product of the compound (II) are commercially available, for instance, from COLCOAT CO., LTD. under the trade marks "MSI 51", "ESI 28", "ESI 40", "HAS-1" and "HAS-10" which are partial hydrolysis condensation product of a tetraalkyl silicate, or from Shin-Etsu Chemical Co., Ltd under the trade mark "AFP-1" which is a partial hydrolysis condensation product of a trialkoxysilane.

The silicon compounds (II) and their partial hydrolysis condensates may be used alone or in admixture thereof.

A partial hydrolysis condensation product of tetramethyl silicate commercially available under the trade mark "MSI 51" and a partial hydrolysis condensation product of tetraethyl silicate commercially available under the trade mark "ESI 40" are preferred as the component (B), since the compatibility with acrylic copolymer (A) and the curability of the obtained composition are good and coating films formed from the composition is superior in hardness.

The curable composition of the present invention contains, as a component (C) to assist curing reaction of the acrylic copolymer (A) and the silicon compound (B), at least one curing catalyst selected from the group consisting of an organic carboxylic acid compound, a combination of an organic carboxylic acid compound and an organic amine compound, and an organometallic compound.

The organic carboxylic acid compound includes saturated or unsaturated mono- or polycarboxylic acids their anhydrides.

Examples of the organic carboxylic acid are, for instance, butanoic acid, pentanoic acid, hexanoic acid, 2-ethylhexanoic acid, maleic acid, adipic acid, azelaic acid, sebacic acid, itaconic acid, citric acid, succinic acid, phthalic acid, trimellitic acid, pyromellitic acid, benzoic acid, and anhydrides of these saturated or unsaturated mono- or polycarboxylic acids.

The combination of an organic carboxylic acid and an organic amine means a mixture or a reaction product of a saturated or unsaturated mono- or polycarboxylic acid and/or its anhydride with an organic amine. The saturated or unsaturated mono- or polycarboxylic acids as exemplified above and their anhydrides can be used as the organic carboxylic acid for this combined catalyst system.

Examples of the organic amine used in the combined catalyst system are, for instance, a primary amine such as hexylamine, myristylamine or dodecylamine; a secondary amine such as N, N-dimethylamine, dimyristylamine or di(2-ethylhexyl)amine; a tertiary amine such as dimethyloctylamine, dimethyldecylamine, dimethyldimethyloctylamine, dimethylpalmitylamine, dimethylstearylamine, dimethyldodecylamine, triethylamine or trioctylamine; a polyamine such as hexamethylenediamine, tetramethylhexamethylenediamine, tetramethylpropylenediamine or triethyldiamine; a cyclic amine such as piperazine, N-methylmorpholine, N-ethylmorpholine, N,N',N"-tris(3-dimethylaminopropyl)hexahydro-S-triazine, trimethylaminoethylpiperazine or triethylenediamine; an aminosilane compound such as aminoethylaminopropyltrimethoxysilane, γ-aminopropyltrimethoxysilane, γ-aminopropyldimethoxysilane, γ-aminopropyltriethoxysilane or γ-aminopropyldiethoxysilane, a reaction product of the aminosilane compound with an epoxy compound such as γ-glycidoxypropyltrimethoxysilane or an epoxy resin commercially available under the trade mark "Epikote" 828 or "Epikote" 1001 (product of Yuka Shell Epoxy Kabushiki Kaisha); and the like.

Representative examples of the combined catalyst composed of organic carboxylic acid and organic amine are, for instance, a combination of a saturated or unsaturated monocarboxylic acid with a primary, secondary or tertiary amine such as propionic acid/laurylamine, butyric acid/monomethyllaurylamine, hexanoic acid/- triethylamine, octylic acid/dimethyllaurylamine, 2-ethylhexanoic acid/triethylamine or hexenoic acid/dimethylstearylamine; a combination of a saturated or unsaturated monocarboxylic acid with a polyamine such as propionic acid/hexamethylene diamine, butylic acid/N,N,N',N'-tetramethylpropylenediamine or hexenoic acid/N,N,N',N'-tetramethylhexamethylenediamine; a combination of a saturated or unsaturated monocarboxylic acid with a cyclic amine such as 2-ethylhexanoic acid/pyridine, hexanoic acid/pyridine, 2-ethylhexanoic acid/piperazine, hexanoic acid/piperazine, propionic acid/N-methylmorpholine, octylic acid/triethylenediamine, lauric acid/trimethylaminoethylpiperazine or hexenoic acid/N-ethylmorpholine; a combination of a saturated or unsaturated monocarboxylic acid with an aminosilane compound such as propionic acid/3-aminopropyltriethoxysilane, butyric acid/3-(2-aminoethyl)aminopropyltrimethoxysilane, hexanoic acid/3-ureidopropyltriethoxysilane [NH$_2$CONHC$_3$H$_6$Si(OC$_2$H$_5$)$_3$], 2-ethylhexanoic acid/$\gamma$-aminopropyltriethoxysilane or hexenoic acid/3-(2-aminoethyl)aminopropyltrimethoxysilane; a combination of a saturated or unsaturated monocarboxylic acid with a reaction product of an aminosilane compound and an epoxy compound such as 2-ethylhexanoic acid/a condensate of 3-aminopropyltriethoxysilane and bisphenol A diglycidyl ether in a molar ratio of 2:1 or hexenoic acid/a condensate of 3-(2-aminoethyl)aminopropyltrimethoxysilane and 3-glycidoxypropyltrimethoxysilane in a molar ratio of 1:2.2; a combination of a saturated or unsaturated polycarboxylic acid with a primary, secondary or tertiary amine such as maleic acid/laurylamine, maleic acid/monomethyllaurylamine, maleic acid/dimethyllaurylamine, fumaric acid/laurylamine, fumaric acid/monomethyllaurylamine, fumaric acid/dimethyllaurylamine, succinic acid/laurylamine, succinic acid/monomethyllaurylamine, succinic acid/dimethyllaurylamine, phthalic acid/dimethyllaurylamine or trimellitic acid/laurylamine; a combination of a saturated or unsaturated polycarboxylic acid with a polyamine such as maleic acid/hexamethylenedismine, fumaric acid/hexamethylenediamine, phthalic acid/hexamethylenediamine, trimellitic acid/hexamethylenedismine, itaconic acid/propylenediamine or succinic acid/hydrazine; a combination of a saturated or unsaturated polycarboxylic acid with a cyclic amine such as maleic acid/piperazine, fumaric acid/N-methylmorpholine, phthalic acid/triethylenediamine, trimellitic acid/trimethylaminoethylpiperazine or succinic acid/N-ethylmorpholine; a combination of a saturated or unsaturated polycarboxylic acid with an aminosilane compound such as maleic acid/3-aminopropyltriethoxysilane, maleic acid/3-(2-aminoethyl)aminopropyltrimethoxysilane, phthalic acid/3-ureidopropyltrimethoxysilane, trimellitic acid/$\gamma$-aminopropyltriethoxysilane or succinic acid/3-(2-aminoethyl)aminopropyltrimethoxysilane; a combination of a saturated or unsaturated polycarboxylic acid with a reaction product of an aminosilane compound and an epoxy compound such as maleic acid/a condensate of $\gamma$-aminopropyltriethoxysilane and bisphenol A diglycidyl ether in a molar ratio of 2:1, phthalic acid/a condensate of $\gamma$-aminopropyltriethoxysilane and bisphenol A diglycidyl ether in a molar ratio of 2:1 or trimellitic acid/a condensate of 3-(2-aminoethyl)aminopropyltrimethoxysilane and 3-glycidoxypropyltrimethoxysilane in a molar ratio of 1: 2.2; and the like.

The combined catalyst system composed of organic carboxylic acid and organic amine in the form of a mixture or a reaction product may be further mixed with an aminosilane compound.

Among the combined catalyst systems, there are preferred a combination of a saturated or unsaturated monocarboxylic acid with a tertiary amine from the viewpoint of a balance between curability and pot life, and a combination of an organic mono- or polycarboxylic acid with an aminosilane and/or a reaction product of an aminosilane and an epoxy compound from the viewpoints of curability and adhesion. Further, when the tertiary amine in the above combination of the monocarboxylic acid with the tertiary amine is an aminosilane compound and/or a reaction product of an aminosilane and an epoxy compound, excellent curability and adhesion are obtained.

In the combined catalyst system composed of organic carboxylic acid and organic amine, 2-ethylhexanoic acid and hexanoic acid are preferred as the organic carboxylic acid, and dimethyldodecylamine and dodecylamine are preferred as the organic amine, since the compatibility is good and coating films having a good water resistance are formed from the obtained composition.

It is preferable that the ratio of the organic carboxylic acid to the organic amine in the combined catalyst system is from 0.3:1 to 3:1, especially from 0.5:1 to 2.5:1, in terms of amino group/carboxyl group ratio. When the ratio is outside the above range, the rate of curing tends to be decreased or the pot life tends to be shortened. This tendency is seen in all combined catalyst systems, and even in the above-mentioned preferable combined catalyst systems, namely a combination of a monocarboxylic acid with a tertiary amine, a combination of a mono- or polycarboxylic acid with an aminosilane and/or its reaction product with an epoxy compound, and the former combination wherein the tertiary amine is an aminosilane and/or its reaction product with an epoxy compound.

In case of using a combined catalyst system, it is preferable to previously admix the organic carboxylic acid and the organic amine, and then add the resulting mixture to a mixture of the acrylic copolymer (A) and the silicon compound (B). When the carboxylic acid and the amine are used after previously mixing them, the combined catalyst is hard to be subject to the influence of groups such as carboxyl group or amino group which may be present in the acrylic copolymer (A).

General organometallic compounds known as a silanol condensation catalyst can be used as the above-mentioned organometallic compound, e.g. organotin compound, organotitanium compound, organozirconium compound and organoaluminum compound.

Examples of the organotin compound are, for instance, dibutyl tin dilaurate, dibutyl tin dimaleate, dioctyl tin dilaurate, dioctyl tin dimaleate, tin octylate, and the like.

Examples of the organotitanium compound are, for instance, isopropyltriisostealoyl titanate, isopropyltris(dioctylpyrophosphate) titanate, bis(dioctylpyrophosphate)oxyacetate titanate, and the like.

Examples of the organozirconium compound are, for instance, tetrabutyl zirconate, tetrakis(acetylacetonato)zirconium, tetraisobutyl zirconate, butoxytris(acetylacetonato)zirconium, and the like.

Examples of the organoaluminum compound are, for instance, tris(ethylacetoacetato)aluminum, tris-(acetylacetonato)aluminum, and the like.

Among the organometallic compounds, dibutyl tin alkyl esters such as dibutyl tin alkylmaleate or laurate are preferred since the curability and a balance between curability and pot life are good, and the contact angle of coatings becomes small. Examples of the dibutyl tin alkyl ester are, for instance, dibutyl tin bisethylmaleate, dibutyl tin bisbutylmaleate, dibutyl tin bisoctylmaleate, dibutyl tin bisoleylmaleate, dibutyl tin dilaurate, dibutyl tin fatty acid salt, dibutyl tin bisacetylacetate, dibutyl tin diacetate, dibutyl tin dioctoate, dibutyl tin oxide, dibutyl tin bistriethoxysilicate, and their reaction products.

The curing catalysts may be used alone or in admixture of two or more catalysts of the same or different type.

A silane coupling agent, its reaction product or a mixture thereof is incorporated into the composition of the present invention as adhesion improver (D) in order to raise the adhesion between the coatings formed from the composition and an organic material on or of a substrate. For example, if a curable composition comprising the acrylic copolymer (A), the silicon compound (B) and the curing catalyst (C) is coated onto an epoxy resin coat generally used as an intermediate coat for building use, a problem may arise in adhesion therebetween though the composition has an excellent stain resistance as mentioned before. In such a case, the adhesion to organic materials such as the epoxy resin intermediate coat can be secured by incorporating the silane coupling agent. The silane coupling agent and its reaction product are hereinafter referred to as "silane coupling agent (D)".

Silane coupling agents having both an alkoxysilyl group such as methoxysilyl group or ethoxysilyl group as an inorganic functional group and a group such as a halogen, vinyl group, methacryloyloxy group, a cyclic epoxy group, glycidoxy group, mercapto group, amino group, diamino group or ureido group as an organic functional group are preferably used as the silane coupling agent in the component (D). Especially, silane coupling agents having an alkoxysilyl group and amino group or glycidoxy group provide an excellent adhesion to coatings.

Examples of the silane coupling agent (D) used in the present invention are, for instance, an aminosilane compound such as aminoethylaminopropyltrimethoxysilane, γ-aminopropyltrimethoxysilane, γ-aminopropyldimethoxysilane, γ-aminopropyltriethoxysilane or γ-aminoproipyldiethoxysilane; an epoxysilane compound such as γ-glycidoxypropylmethoxysilane or β-epoxycyclohexylethyltriethoxysilane; and a reaction product of the aminosilane compound with an epoxy compound. Examples of the epoxy compound used to react with the aminosilane are, for instance, the epoxysilane as mentioned above, a bisphenol A epoxy resin, a bisphenol F epoxy resin, and the like. The epoxy compounds may be used alone or in admixture thereof.

One or more of the silane coupling agents and their reaction products can be used in the present invention.

The silicon compound (B) is used in an amount of 2 to 70 parts by weight, especially 5 to 60 parts by weight, per 100 parts by weight of the acrylic copolymer (A). It is preferable to use the silicon compound (B) in an amount of at least 5 parts, especially at least 10 parts, and at most 60 parts by weight, especially at most 50 parts by weight. When the amount of the silicon compound (B) is less than 2 parts by weight, the stain resistance of coating films formed from the obtained composition is not sufficiently improved. When the amount is more than 70 parts by weight, the appearance of the coating films such as surface gloss is lowered or cracking of the films occurs.

The curing catalyst (C) is used in an amount of 0.1 to 20 parts by weight, especially 0.1 to 10 parts by weight, per 100 parts by weight of the acrylic copolymer (A). It is preferable to use the catalyst (C) in an amount of at least 0.5 part by weight and at most 10 parts by weight, especially at most 5 parts by weight. When the amount of the catalyst (C) is less than 0.1 part by weight, the curability of the obtained composition is lowered. When the amount is more than 20 parts by weight, the appearance of coating films such as surface gloss is lowered.

The silane coupling agent (D), namely silane coupling agent and/or its reaction product, is used in an amount of 0.1 to 20 parts by weight, especially 0.2 to 10 parts by weight, per 100 parts by weight of the acrylic copolymer (A). It is preferable to use the component (D) in an amount of at least 0.2 part, especially at least 0.5 part by weight, and at most 10 parts by weight, especially at most 6 parts by weight. When the amount of the component (D) is less than 0.1 part by weight, the adhesion of coating films is lowered. When the amount is more than 20 parts by weight, the appearance of coating films such as surface gloss is lowered.

The curable composition suitable for top coat use according to the present invention can be prepared by mixing the components (A) to (D) to give a uniform composition using for instance a mixer or an agitator. A dehydrating agent or an alkyl alcohol may be added to the acrylic copolymer (A) or the silicon compound (B), whereby the composition can be stably stored over a long period of time. The addition can be made in any stage. For example, the dehydrating agent and/or the alkyl alcohol may be added to the starting materials for the polymerization prior to the preparation of the acrylic copolymer (A), or to a polymerization system during the polymerization, or to a mixture at the time of mixing the acrylic copolymer (A) with other components to prepare a coating composition.

Representative example of the dehydrating agent is a hydrolyzable ester compound. Examples of the hydrolyzable ester compound are, for instance, methyl orthoformate, ethyl orthoformate, methyl orthoacetate, ethyl orthoacetate, methyl silicate and ethyl silicate.

Preferably, a lower alkyl alcohol having 1 to 4 carbon atoms is used as the alkyl alcohol to improve the storage stability, e.g. methanol and ethanol.

The amount of the dehydrating agent and/or the alkyl alcohol is not particularly limited. In general, the amount is selected so that the total amount of the dehydrating agent and the alkyl alcohol is from about 0.5 to about 20 parts by weight, preferably about 2 to about 10 parts by weight, per 100 parts by weight of the acrylic copolymer (A).

The curable resin composition suitable for top coating according to the present invention may contain other additives which have been usually employed in paints, for example, pigments, e.g. an inorganic pigment such as titanium oxide, ultramarine blue, iron blue, zinc oxide, red iron oxide, chrome yellow, white lead, carbon black, transparent iron oxide or aluminum powder, and an organic pigment such as azo pigment, triphenylmethane pigment, quinoline pigment, anthraquinone pigment or phthalocyanine pigment; additives such as diluent, ultraviolet absorber, light stabilizer, antisag agent and leveling agent; celluloses such as nitrocellulose and cellulose acetate butyrate; and resins such as epoxy resin, reelamine resin, vinyl chloride resin, fluorocarbon resin, chlorinated polypropylene, chlorinated rubber, polyvinyl butyral or organopolysiloxane.

The curable composition of the present invention is applied to materials to be coated in a usual manner, such as dipping, spraying or brush coating, and is cured usually at ordinary temperature (namely by means of cold curing) or is cured by baking at an elevated temperature over about 30° C.

The curable composition of the present invention is applicable as a top coat paint to buildings or building materials, household electric appliances, industrial equipments, ceramic products and others, which are made of metals, ceramics, glass, cement, plastics, woods, paper, fibers or the like.

The present invention is more specifically described and explained by means of the following Examples in which all % and parts are by weight unless otherwise noted. It is to be understood that the present invention is not limited to these Examples.

Reference Example 1

[Preparation of acrylic copolymer (A)]

A reactor equipped with a stirrer, a thermometer, a reflux condenser, a tube for introducing nitrogen gas and a dropping funnel was charged with 40 parts of xylene, and the reactor was heated to 110° C. with introducing nitrogen gas thereto. A mixture of 10 parts of γ-methacryloyloxypropyltrimethoxysilane, 30 parts of methyl methacrylate, 45 parts of n-butyl methacrylate, 14 parts of n-butyl acrylate, 1 part of acrylamide, 18 parts of xylene and 1 part of 2,2'-azobisisobutyronitrile was added dropwise to the reactor at a constant rate through the dropping funnel over 5 hours.

After the completion of the addition, a solution of 0.5 part of 2,2'-azobisisobutyronitrile in 5 parts of toluene was added dropwise to the reactor at a constant rate over 1 hour. Further, the reaction mixture was aged at 110° C. for 2 hours, and it was then cooled. The reaction mixture was diluted with xylene to give a solution of acrylic copolymer (A-1) having a solid concentration of 50% The acrylic copolymer (A-1) had a number average molecular weight of 15,000.

Reference Example 2

[Preparation of acrylic copolymer (A)]

A solution of acrylic copolymer (A-2) having a solid concentration of 50% was prepared in the same manner as in Example 1 except that 12 parts of γ-methacryloyloxypropyltrimethoxysilane, 55 parts of methyl methacrylate, 32 parts of n-butyl acrylate and 1 part of acrylamide were used as the monomers.

The acrylic copolymer (A-2) had a number average molecular weight of 15,000.

Reference Example 3

[Preparation of acrylic copolymer (A)]

A solution of acrylic copolymer (A-3) having a solid concentration of 50% was prepared in the same manner as in Example 1 except that 50 parts of γ-methacryloyloxypropyltrimethoxysilane, 14 parts of methyl methacrylate, 15 parts of n-butyl acrylate and 20 parts of n-butyl methacrylate and 1 part of acrylamide were used as the monomers and azobisisobutyronitrile was used in an amount of 4 parts.

The acrylic copolymer (A-3) had a number average molecular weight of 7,000.

Reference Example 4

[Preparation of adhesion improver (D)]

A reactor equipped with a stirrer, a thermometer, a reflux condenser and a tube for introducing nitrogen gas was charged with 56 parts of a bisphenol A epoxy resin (commercially available under the trade mark "Epikote" 828 from Yuka Shell Epoxy Kabushiki Kaisha) and 100 parts of xylene, and a nitrogen gas was introduced into the reactor with stirring. To the reactor was then added 64 parts of γ-aminopropyltriethoxysilane the ratio of which to the epoxy resin was 2:1 by mole. After mixing at room temperature for 1 hour, the temperature was elevated to 70° C. and the reaction was further conducted at that temperature for 2 hours. The reaction mixture was cooled and it was confirmed by IR analysis that the absorption based on epoxy group disappeared, thus a reaction mixture containing an aminosilane reaction product (solid residue when heated at 105° C. for 2 hours: 50%) was obtained as adhesion improver (D-1).

EXAMPLE 1

To the solution of acrylic copolymer (A-1) obtained in Reference Example 1 was added 30 parts of a partial hydrolysis condensation product of tetramethyl silicate (commercially available under the trade mark "MSI 51" from COLCOAT CO., LTD.) as the silicon compound (B) per 100 parts of the solid matter of the acrylic copolymer solution. To the resulting mixture was then added 40 parts of titanium dioxide as a pigment (commercially available under the trade mark "Titanium White CR-90" from Ishihara Sangyo Kabushiki Kaisha), and dispersed for 2 hours by a paint conditioner using glass beads to give a white enamel having a solid concentration of 60%.

Equal amounts of 2-ethylhexanoic acid (hereinafter referred to as "C-1") and dodecylamine (hereinafter referred to as "C-2") were previously mixed to give catalyst (C). This mixture as the catalyst and the adhesion improver (D-1) obtained in Reference Example 4 were added to the white enamel so that the components (C-1), (C-2) and (D-1) are present in amounts of 0.25 part, 0.25 part and 2 parts, respectively, per 100 parts of the solid matter of the acrylic copolymer solution. The resulting mixture was then diluted with a thinner and stirred for 5 minutes to give a coating composition having a solid concentration of 45%.

The coating composition was air-sprayed onto an aluminum plate (A5052P) in a dry film thickness of about 30 μm, and was aged (cured) at 23° C. for 7 days to form a coating film.

The obtained coating film was estimated according to the following methods with respect to surface appearance, gloss, stain resistance, weatherability, contact angle and adhesion.

The results are shown in Table 1.

(a) Surface Appearance

The surface of a coating film was visually observed and estimated according to the following criteria.

(Estimation)

A: No cracking is observed and the surface appearance is good.

B: Partial cracking or fine cracks are observed.
C: Cracks are observed over the entire surface.
(b) Gloss
The gloss of the film surface was measured using a color difference glossimeter (model CDX-101 made by Kabushiki Kaisha Shikisai Kenkyusho) according to JIS K 5400 (60° gloss).
(c) Stain Resistance (ΔL value)
A coating film was subjected to outdoor exposure for 3 months at Settsu-shi, Osaka, Japan. L-values (brightness) of the unexposed film (film just formed) and the exposed film were measured by the color difference glossimeter model CDX-101, and the difference (ΔL value) was obtained.
(d) Weatherability (Gloss Retention)
The gloss of a film surface was measured with respect to a coating film just formed and a coating film subjected to accelerated weathering test for 2,000 hours using a accelerated weathering tester (Sunshine Weather-O-Meter), and the gloss retention (%) of the exposed film was obtained.
(e) Contact Angle
Static contact angle of water to a coating film just formed was measured by a contact angle measuring instrument (model CA-S150 made by Kyowa Kaimen Kagaku Kabushiki Kaisha).
(f) Adhesion
An epoxy intermediate coat (commercially available under the trade mark "NY Poline K Intemediate Coat" made by Shinto Toryo Kabushiki Kaisha) was coated onto a steel plate, and the coating composition was coated thereon next day. After aging one day at room temperature (23° C., humidity 55%), and the film was subjected to a cross-cut adhesion test according to JIS K 5400 and was estimated according to the following rating.

(Rating)
10: 100/100
8: 80/100
6: 60/100
4: 40/100
2: 20/100
0/100

EXAMPLES 2 to 8
and Comparative Examples 1 to 4

A white enamel having a solid concentration of 60% was prepared and a coating composition having a solid concentration of 45% was then prepared from the white enamel in the same manner as in Example 1 except that the components shown in Table 1 were used.

The obtained coating composition was air-sprayed onto an aluminum plate (A5052P) in a dry film thickness of about 30 μm and was aged under curing conditions shown in Table 1 to give a coating film.

The properties of the coating film were measured in the same manner as in Example 1. The results are shown in Table 1.

Marks in Table 1 show the following compounds.
C-1: 2-Ethylhexanoic acid
C-2: Dodecylamine
C-3: Hexenoic acid
C-4: γ-Aminopropyltrimethoxysilane
C-5: Maleic anhydride
C-6: Dibutyl tin bisbutylmaleate
D-1: Aminosilane reaction product prepared in Ref. Ex. 4
D-2: γ-Aminopropyltrimethoxysilane
D-3: γ-Glycidoxypropyltrimethoxysilane
OcSnM: Dioctyl tin maleate
L7607: Surface active agent made by Nippon Unicar Kabushiki Kaisha

TABLE 1

| | Acrylic copolymer (A) | Silicon compound (B) | Curing catalyst (C) Composition | Amino group/ COOH ratio | Adhesion improver (D) | Others | Curing conditions Temperature (°C.) | Period |
|---|---|---|---|---|---|---|---|---|
| Ex. 1 | A-1 (100) | MSI51 (30) | C-1 (0.25) C-2 (0.25) | 0.78 | D-1 (2.0) | — | 23 | 7 days |
| Ex. 2 | A-2 (100) | MSI51 (7) | C-3 (0.25) C-2 (0.25) | 0.53 | D-1 (2.0) D-3 (0.5) | | 140 | 20 min. |
| Ex. 3 | A-1 (100) | ESI40 (30) | C-1 (0.25) C-2 (0.25) C-5 (0.2) | 0.23 | D-3 (1.5) | | 140 | 20 min. |
| Ex. 4 | A-1 (100) | MSI51 (20) ESI40 (30) | C-1 (0.25) C-4 (0.5) C-2 (0.25) | 2.39 | D-1 (15.0) | | 23 | 7 days |
| Ex. 5 | A-2 (100) | MSI51 (20) ESI40 (20) | C-6 (0.5) | — | D-2 (0.2) | — | 23 | 7 days |
| Ex. 6 | A-1 (100) | MSI51 (30) ESI40 (20) | C-6 (0.5) C-7 (0.5) | — | D-1 (1.0) D-2 (0.5) | — | 23 | 7 days |
| Ex. 7 | A-1 (100) | MSI51 (15) ESI40 (15) | C-1 (0.15) C-2 (0.15) C-6 (0.4) | 0.78 | D-2 (0.5) D-3 (0.5) | | 23 | 7 days |
| Ex. 8 | A-3 (100) | MSI51 (20) ESI40 (40) | C-1 (0.15) C-2 (0.15) | 0.78 | D-1 (15.0) D-2 (1.0) | | 23 | 7 days |
| Com. Ex. 1 | A-1 (100) | — | C-1 (0.25) C-2 (0.25) | 0.78 | D-1 (1.0) D-2 (0.5) | | 23 | 7 days |
| Com. Ex. 2 | A-2 (100) | MSI51 (50) ESI40 (25) | C-1 (0.25) C-2 (0.25) | 0.78 | — | — | 23 | 7 days |
| Com. Ex. 3 | A-1 (100) | MSI51 (40) | OcSnM (0.5) | | — | — | 140 | 20 min. |
| Com. Ex. 4 | A-1 (100) | — | OcSnM (0.5) | | — | L7607 (15) | 23 | 7 days |

| | Properties of coating film | | | | | |
|---|---|---|---|---|---|---|
| | Surface Appearance | Gloss | Stain resistance (ΔL) | Weatherability (gloss retention %) | Contact angle | Adhesion |
| Ex. 1 | A | 86 | −1.8 | 90 | 56° | 10 |
| Ex. 2 | A | 84 | −1.3 | 91 | 63° | 10 |

TABLE 1-continued

| | | | | | | |
|---|---|---|---|---|---|---|
| Ex. 3 | A | 85 | −1.2 | 87 | 61° | 10 |
| Ex. 4 | A | 85 | −1.4 | 93 | 55° | 10 |
| Ex. 5 | A | 87 | −1.5 | 92 | 60° | 10 |
| Ex. 6 | | 86 | −1.2 | 93 | 61° | 10 |
| Ex. 7 | A | 87 | −1.9 | 95 | 64° | 10 |
| Ex. 8 | A | 83 | −0.9 | 91 | 50° | 10 |
| Com. Ex. 1 | A | 87 | −6.2 | 83 | 88° | 10 |
| Com. Ex. 2 | C | 52 | −0.9 | — | — | 6 |
| Com. Ex. 3 | C | 63 | −1.2 | 87 | 86° | 4 |
| Com. Ex. 4 | A | 85 | −9.9 | 77 | 45° | 6 |

From the results shown in Table 1, it is apparent that the compositions obtained in Examples 1 to 8 are curable at ordinary temperature and provide coating films not only having no crack, good gloss and surface appearance and excellent weatherability, but also having excellent stain resistance and adhesion and a small contact angle.

In addition to the ingredients used in the Examples, other ingredients can be used in the Examples as set forth in the specification to obtain substantially the same results.

What we claim is:

1. A curable composition suitable as a top coat which comprises:

(A) an acrylic copolymer having a reactive silicon-containing group of the formula (I):

wherein $R^1$ is hydrogen atom or an alkyl group having 1 to 10 carbon atoms, $R^2$ is hydrogen atom or a monovalent hydrocarbon group selected from the group consisting of an alkyl group having 1 to 10 carbon atoms, an aryl group and an aralkyl group, and a is 0, 1 or 2, (B) 2 to 70 parts of at least one member selected from the group consisting of a silicon compound of the formula (II):

wherein $R^a$ is a monovalent hydrocarbon group selected from the group consisting of an alkyl group having 1 to 10 carbon atoms, an aryl group and an aralkyl group, $R^4$ is a monovalent hydrocarbon group selected from the group consisting of an alkyl group having 1 to 10 carbon atoms, an aryl group and an aralkyl group, and b is 0 or 1, and a condensate of a partial hydrolysis product of said silicon compound (II), (C) 0.1 to 20 parts of at least one curing catalyst selected from the group consisting of an organic carboxylic acid compound, a combination of an organic carboxylic acid compound and an organic amine compound, and an organometallic compound, and (D) 0.1 to 20 parts of an agent for improving adhesion, said parts of (B), (C) and (D) being parts by weight per 100 parts by weight of said acrylic copolymer (A).

2. The composition of claim 1, wherein said acrylic copolymer (A) is a copolymer containing 3 to 90% by weight of units derived from a monomer having said reactive silicon-containing group (I).

3. The composition of claim 1, wherein said acrylic copolymer (A) contains units of n-butyl methacrylate.

4. The composition of claim 1, wherein said curing catalyst (C) is a combination of a saturated or unsaturated monocarboxylic acid and a tertiary amine.

5. The composition of claim 1, wherein said organic amine compound in said combination of an organic carboxylic acid compound and an organic amine compound contains an aminosilane compound, its reaction product or a mixture thereof.

6. The composition of claim 1, wherein said curing catalyst (C) is a combination of an organic carboxylic acid compound and an organic amine compound in an amino group/carboxyl group ratio of 0.2 to 3.

7. The composition of claim 1, wherein said organometallic compound is a dibutyl tin alkyl ester.

8. The composition of claim 1, wherein said agent (D) for improving adhesion is at least one member selected from the group consisting of a silane coupling agent and its reaction product.

9. The composition of claim 1, wherein said agent (D) for improving adhesion is at least one member selected from the group consisting of a silane coupling agent having amino group, a silane coupling agent having glycidoxy group and a reaction product of a silane coupling agent having amino group with an epoxy compound.

* * * * *